United States Patent [19]

Fiumi

[11] Patent Number: 4,673,266
[45] Date of Patent: Jun. 16, 1987

[54] DISPLAY OF SUBTITLES DURING THE SCREENING OF A MOTION PICTURE

[76] Inventor: Fabrizio Fiumi, Via S. Agostino, 5, 50125 Firenze, Italy

[21] Appl. No.: 620,985

[22] Filed: Jun. 15, 1984

[30] Foreign Application Priority Data

Jun. 17, 1983 [IT] Italy .................................. 9458 A/83

[51] Int. Cl.$^4$ ............................................. G03B 21/32
[52] U.S. Cl. ......................................... 352/90; 352/5; 352/92
[58] Field of Search ...................... 352/5, 90, 92, 133, 352/89, 70

[56] References Cited

U.S. PATENT DOCUMENTS

| | | | |
|---|---|---|---|
| 1,394,797 | 10/1921 | Smith | 352/89 |
| 3,282,155 | 11/1966 | Cleary et al. | 352/91 R |
| 3,594,077 | 7/1971 | Marquis et al. | 352/133 |
| 3,675,993 | 7/1972 | Ebeling | 352/92 |
| 3,854,802 | 12/1974 | Gazale | 352/92 |
| 4,215,920 | 8/1980 | Butler | 352/92 |
| 4,385,814 | 5/1983 | Elliott | 352/92 |

FOREIGN PATENT DOCUMENTS

| | | | |
|---|---|---|---|
| 718204 | 1/1932 | France | 352/90 |
| 318209 | 12/1956 | Switzerland | 352/90 |

*Primary Examiner*—Monroe H. Hayes
*Attorney, Agent, or Firm*—Berman, Aisenberg & Platt

[57] ABSTRACT

Method and apparatus for display of subtitles in connection with a motion picture are disclosed. A film strip includes coded signals adjacent a frame to be projected. These signals are detected by a detector and a microprocessor is controlled by the detector. The microprocessor has a sequence of subtitles recorded in a memory, and a display is activated by the microprocessor to exhibit a subtitle which corresponds to a detected coded signal. The microprocessor can contain subtitles for a plurality of languages, and multiple displays may be employed.

13 Claims, 3 Drawing Figures

DISPLAY OF SUBTITLES DURING THE SCREENING OF A MOTION PICTURE

TECHNICAL FIELD

This invention relates to the art of exhibiting motion pictures and the display of subtitles.

BACKGROUND ART

During the screening of motion pictures, there is frequently a need for the simultaneous projection of subtitles which follow the unfolding of the film. The subtitles contain a synthesized translation of the sound track of the original film.

Generally, the film print itself is used to show the subtitles which have been placed on successive print frames. Each subtitle is in a selected language and is projected onto the screen along with the picture. The subtitle is thus inherently timed with the projection.

This system is particularly time-consuming and expensive. A substantial amount of laboratory time is required to place the subtitles on the frames, and a given print must be dedicated permanently to the selected language. A print cannot be used for other than the language of the subtitle because the subtitles are a permanent part of the film. The operation is particularly long because are usually between 700 and 1200 subtitles are required in a feature-length film. Further, in the case of "protected" prints—used today in increasing numbers—it is practically impossile to use the tradiational method of burning in the subtitles.

Other subtitle techniques have been attempted. For example, one system employs a second print having subtitles only and projects the subtitles simultaneously with the original print. This system is particularly complicated because it requires two projectors, two prints of the same length, and synchronization of the two projectors, which is difficult to maintain during a single screening and particularly difficult to maintain for successive screenings.

SUMMARY OF THE INVENTION

The method and apparatus of this invention allow a very simple and fast preparation of a subtitled film. Alteration of the print is avoided, and subtitling of even "protected" prints is facilitated.

A print is marked with coded signals which determine, through the help of a microprocessor, the position and content of a given corresponding subtitle on a display which is preferably spatially separate from the screen on which the picture is projected. The desired subtitles are recorded in a recording device, and each subtitle is caused to appear on the display by a corresponding coded signal which is carried on the print and read by a decoding device.

According to the invention, a print is provided with coded signals which determine the organization and content of a given phrase. The phrase corresponds to the signal and is determined by a coding technique in a microprocesser. The coded signals are placed in limited areas which are preferably outside the picture frame which is projected. The subtitle is preferably displayed on a screen separate from the picture-display screen. A given number of subtitles are pre-recorded in a mass-memory device, and each recorded subtitle is recalled by a corresponding coded signal on the print and displayed.

The signals are preferably formed on the side bands of the print, particularly in the area between the track perforations which engage the projector mechanism to cause forward movement of the film.

The coded signals are alternatively placed only on the first frame of a sequence during which subtitles corresponding to the sequence appear. In order to obtain a predetermined time of display of a subtitle, subsequent cancelling signals may be used. In a preferred embodiment, the starting signal of a successive subtitle (in the case of running dialogue) can be used to terminate a prior subtitle. Other solutions are to use a timer to limit the duration of all subtitles to a given length of time or to varying the length of time according to a program or to provide intermittent interruptions controlled by signals from other subtitles.

A particular advantage of the invention is that different displays can be used simultaneously for different subtitles relating to the same screening. These subtitles can begin or end at different times, with partial contemporaneity. For example, there can first be a subtitle with a question, then the subtitle having the answer so that the subtitle of the question will disappear before the subtitle of the answer appears.

Several displays can be used so that, for example, the same subtitle appears in two or more different languages simultaneously which are completely synchronized with the single print being screened.

With the inventive system, the print is in no way altered, and the same print can be used either without subtitles or with subtitles in various languages. The subtitles are easily recorded and placed in the system. Also, a print already having subtitles can be used to display additional subtitles.

The formation of the subtitles on the display can be obtained by a plurality of selectively activated dots or by any other suitable means.

A preferred apparatus for the described method includes: a signal reader; a microprocessor with interchangeable mass memory elements to hold ordered subtitles; and at least one display, usually with dots which light up to form the various successive subtitles according to the software in the microprocessor.

The system may alternatively include means for regulating the intensity of the display. The intensity may remain constant for the duration of the screening, or may be variable according to the intensity of the picture being projected. An advantage of this is that the intensity can increase gradually at the beginning and decrease gradually at the end of the display of the subtitle.

A print for use in the above mentioned and for use in the equipment mentioned above bears coded signals on the area outside of the frame, for example, in the area between the perforations in a print. These signals may be of any design but are preferably bar signals. The signals may be formed by any known system; they can even be applied with the so-called "transfer" system and then protected. As an alternative, the signals can be magnetic, with applied discontinuous, magnetically supported zones. Preferably, the zone is continuous and employs localized magnetization. Such a zone can be a separate track of a preparation on the entire print.

DETAILED DESCRIPTION

Figure 1:
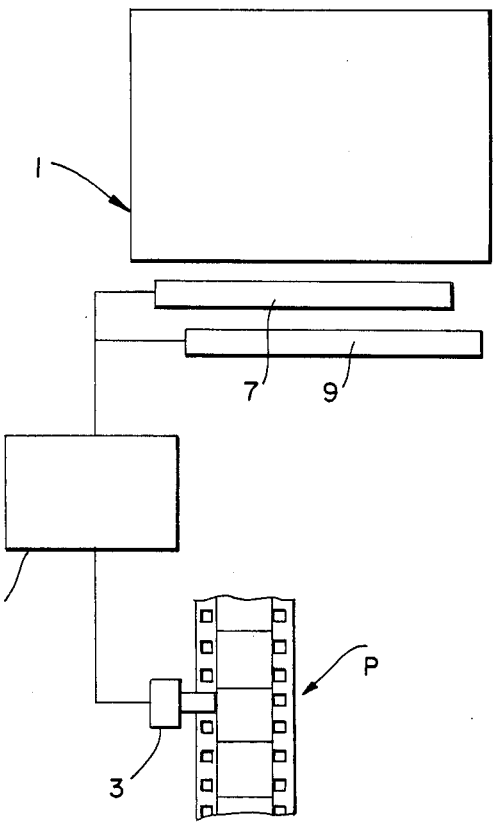
FIG. 1 is a schematic view of a system according to the invention.

With reference to FIG. 1, a projection screen 1 receives an image of a film frame to allow an audience to view the film.

A film strip P contains successive frames and cooperates with a known projector (not shown) to project an image onto screen 1.

A reader 3 is located adjacent film strip P. The reader detects the coded signals on the strip P and sends signals to decoder 5, which is preferably a microprocessor with cards, disks, or other mass memory elements. Subtitles to be displayed in coordination with the images of the film strip are recorded in the microprocessor 5. Decoded signals select each subtitle to be successively displayed for a predetermined length of time, until a cancelling signal is sensed by reader 3, or until a successive subtitle signal is sensed.

Decoder 5 commands one or two displays 7 and 9, where the subtitles are formed, in accordance with detected signals. Each subtitle uniquely corresponds to a signal.

The displays 7, 9 are placed in suitable positions adjacent projection screen 1. The positions are such that the screen will not interfere with the subtitle displays and the subtitles are easily seen.

Figure 2:
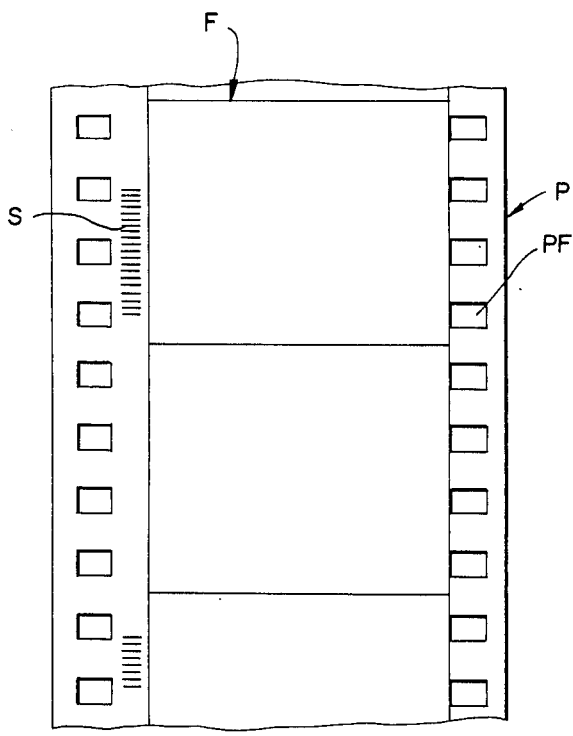
FIGS. 2 and 3 show alternative films having coded signals thereon.
Figure 3:
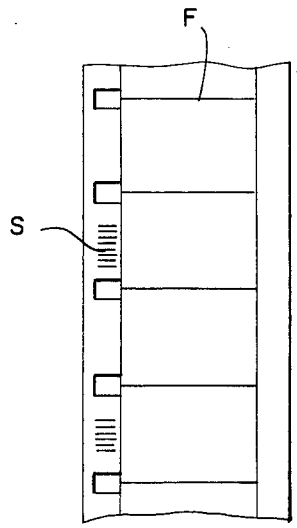

In FIGS. 2 and 3, a frame F is a photographic reproduction of a scene. Perforations PF are at a standard spacing and are on either both edges (35 mm) or along only one edge of the print (16 mm).

According to the invention, signals S, for example in the form of bars, are applied or formed in areas of the film strip which are otherwise unused. In FIG. 2, the signals are shown placed between the row of perforations and the frames. In FIG. 3, a particularly useful placement of signals S is between successive perforations.

The advantages of the invention will be evident to those of skill in the art.

Clearly, the drawing shows only a sample of a practical demonstration of the invention. The invention can vary in form and application without going beyond the bounds of the concept of the invention.

What is claimed is:

1. Apparatus for display of subtitles during projection of a cinematographic film comprising
    a film strip having a plurality of frames adapted to cooperate with a projector for forming an image of said frames, said film strip having coded signals thereon,
    detector means for sensing the presence of said coded signals and for producing an output representative of a sensed coded signal,
    processor means containing a plurality of preselected subtitles for selecting a specific subtitle in response to an input signal from said detector means, and
    display means for displaying said selected subtitle in response to an input from said processor means.

2. Apparatus according to claim 1 wherein said film strip has a portion between an edge of said strip and edges of said frames and wherein said portion contains said coded signals.

3. Apparatus according to claim 2 wherein said portion has perforations therein and said coded signals are located between adjacent perforations.

4. Apparatus according to claim 1 wherein said strip includes coded signals adjacent only the first frame in a sequence of frames which correspond to a given subtitle.

5. Apparatus according to claim 1 wherein said coded signals comprise cancelling signals which, when sensed, caused said processor to terminate display of a particular subtitle.

6. Apparatus according to claim 4 wherein said cancelling signal comprises a signal for a successive subtitle.

7. Apparatus according to claim 1 wherein said processor maintains a time duration of a selected subtitle in accordance with a sensed signal.

8. Apparatus according to claim 1 further comprising a second display means.

9. Apparatus according to claim 8 wherein said display means and said second display means exhibit subtitles in different languages.

10. Apparatus according to claim 1 wherein said display means has a variable intensity which is controlled by said processor.

11. Apparatus according to claim 1 wherein said processor comprises memory means for receiving removable memory elements.

12. Apparatus according to claim 1 wherein said coded signals are optically detected.

13. Apparatus according to claim 1 wherein said coded signals are magnetically detected.

* * * * *